(12) United States Patent
Miyata

(10) Patent No.: US 9,600,219 B2
(45) Date of Patent: Mar. 21, 2017

(54) IMAGE FORMING APPARATUS, POWER SUPPLY CONTROL METHOD FOR IMAGE FORMING APPARATUS, AND STORAGE MEDIUM

(71) Applicant: CANON KABUSHIKI KAISHA, Tokyo (JP)

(72) Inventor: Takaaki Miyata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/758,736

(22) Filed: Feb. 4, 2013

(65) Prior Publication Data

US 2013/0201510 A1    Aug. 8, 2013

(30) Foreign Application Priority Data

Feb. 6, 2012    (JP) ................................ 2012-022870

(51) Int. Cl.
 *G06F 3/12*    (2006.01)
 *G03G 15/00*    (2006.01)

(52) U.S. Cl.
 CPC ....... *G06F 3/1278* (2013.01); *G03G 15/5004* (2013.01)

(58) Field of Classification Search
 CPC . G06F 1/3287; G06F 3/1278; H04N 21/4436; G03G 15/5004; Y02B 60/1267
 USPC ...................................................... 358/1.13
 See application file for complete search history.

(56) References Cited

U.S. PATENT DOCUMENTS

| 8,139,240 B2* | 3/2012 | Miyake .............. H04N 1/00885 358/1.13 |
| 2002/0062455 A1* | 5/2002 | Lee ........................ G06F 1/3203 713/323 |
| 2004/0015733 A1* | 1/2004 | Obara ................... G06F 1/3209 713/300 |
| 2005/0138447 A1* | 6/2005 | Kobayashi ......... H04N 1/00896 713/300 |
| 2006/0053318 A1* | 3/2006 | One ........................ G06F 1/266 713/300 |
| 2006/0143454 A1* | 6/2006 | Walmsley ............... G06F 21/85 713/170 |
| 2006/0222397 A1* | 10/2006 | Lowman ............. G03G 15/5004 399/88 |
| 2007/0250733 A1* | 10/2007 | Ezura ................. G03G 15/5004 713/324 |
| 2007/0250773 A1* | 10/2007 | Moon ................... G11B 27/034 715/716 |
| 2008/0201594 A1* | 8/2008 | Narushima ............. G06F 1/266 713/324 |
| 2009/0063877 A1* | 3/2009 | Lewis ..................... G06F 1/266 713/310 |

(Continued)

FOREIGN PATENT DOCUMENTS

CN    1561057 A    1/2005
CN    101060580 A    10/2007

(Continued)

*Primary Examiner* — Tammy Paige Goddard
*Assistant Examiner* — Edwin S Leland, III
(74) *Attorney, Agent, or Firm* — Canon U.S.A., Inc. IP Division

(57) ABSTRACT

The present invention is directed to an image forming apparatus including a switch configured to shift the image forming apparatus from a power-off state to a first power state.

13 Claims, 10 Drawing Sheets

(56) References Cited

U.S. PATENT DOCUMENTS

| | | | |
|---|---|---|---|
| 2009/0144573 A1* | 6/2009 | Ohhashi | G03G 15/5004 713/323 |
| 2009/0207423 A1* | 8/2009 | Shimizu | G03G 15/5004 358/1.1 |
| 2009/0235098 A1* | 9/2009 | Matsunaga | G06F 1/3284 713/320 |
| 2009/0316178 A1* | 12/2009 | Tanaka | G06F 21/81 358/1.14 |
| 2010/0164440 A1* | 7/2010 | Ikeda | H02J 7/0054 320/162 |
| 2010/0202018 A1* | 8/2010 | Akiyama | G03G 15/5004 358/1.15 |
| 2010/0250987 A1* | 9/2010 | Furukawa | G06F 1/3203 713/323 |
| 2010/0253965 A1* | 10/2010 | Ogisu | G03G 15/5004 358/1.14 |
| 2010/0262849 A1* | 10/2010 | Chan | G06F 1/3203 713/320 |
| 2010/0308736 A1* | 12/2010 | Hung | H05B 37/034 315/149 |
| 2010/0316405 A1* | 12/2010 | Saeki | G03G 15/5004 399/75 |
| 2011/0058206 A1* | 3/2011 | Park | H04N 1/00885 358/1.14 |
| 2011/0058822 A1* | 3/2011 | Shioyasu | H04N 1/00347 399/8 |
| 2011/0060929 A1* | 3/2011 | Park | G06F 1/3209 713/323 |
| 2011/0083022 A1* | 4/2011 | Lai | G06F 1/266 713/300 |
| 2011/0126036 A1* | 5/2011 | Hayakawa | G03G 15/5004 713/323 |
| 2011/0188075 A1* | 8/2011 | Narushima | G06F 1/3284 358/1.15 |
| 2011/0235133 A1* | 9/2011 | Saiki | G03G 15/5004 358/474 |
| 2011/0249291 A1* | 10/2011 | Tsuzuki | G06F 9/5083 358/1.15 |
| 2011/0264942 A1* | 10/2011 | Tsukamoto | G06F 1/266 713/324 |
| 2011/0280608 A1* | 11/2011 | Amemiya | G03G 15/5016 399/88 |
| 2011/0282512 A1* | 11/2011 | Shimizu | G06F 1/263 700/297 |
| 2011/0296219 A1* | 12/2011 | Okuda | G03G 15/5004 713/323 |
| 2011/0317207 A1* | 12/2011 | Shimizu | G06F 1/20 358/1.15 |
| 2012/0011385 A1* | 1/2012 | Sugiyama | G03G 15/5004 713/323 |
| 2012/0159212 A1* | 6/2012 | Takatani | G03G 15/5079 713/320 |
| 2012/0159223 A1* | 6/2012 | Furubayashi | G06F 1/3209 713/323 |
| 2012/0173896 A1* | 7/2012 | Tanaka | G03G 15/5004 713/300 |
| 2012/0191999 A1* | 7/2012 | Takatani | H04N 1/00896 713/323 |
| 2012/0204043 A1* | 8/2012 | Hamasaki | G03G 15/5004 713/320 |
| 2012/0236353 A1* | 9/2012 | Nagayama | G03G 15/5004 358/1.13 |
| 2012/0243022 A1* | 9/2012 | Kamei | G06F 1/3284 358/1.13 |
| 2012/0278640 A1* | 11/2012 | Caglianone | G06F 1/3231 713/323 |
| 2013/0050727 A1* | 2/2013 | Murata | H04N 1/00217 358/1.13 |
| 2013/0073876 A1* | 3/2013 | Cong | G06F 1/3203 713/300 |
| 2013/0083338 A1* | 4/2013 | Fahrenkrug | G06F 3/1221 358/1.13 |
| 2013/0151878 A1* | 6/2013 | Miyata | G06F 1/3237 713/321 |
| 2013/0265607 A1* | 10/2013 | Miyata | G06K 15/406 358/1.15 |
| 2014/0029043 A1* | 1/2014 | Nagami | H04N 1/00904 358/1.14 |

FOREIGN PATENT DOCUMENTS

| | | |
|---|---|---|
| CN | 101515976 A | 8/2009 |
| CN | 102014226 A | 4/2011 |
| JP | H10333506 A | 12/1998 |
| JP | H11202690 A | 7/1999 |
| JP | 2002163045 A * | 6/2002 |
| JP | 2002359705 A * | 12/2002 |
| JP | 2004054561 A * | 2/2004 |
| JP | 2005193652 A * | 7/2005 |
| JP | 2007-108862 A | 4/2007 |
| JP | 2007108862 A * | 4/2007 |
| JP | 2011081603 A * | 4/2011 |

* cited by examiner

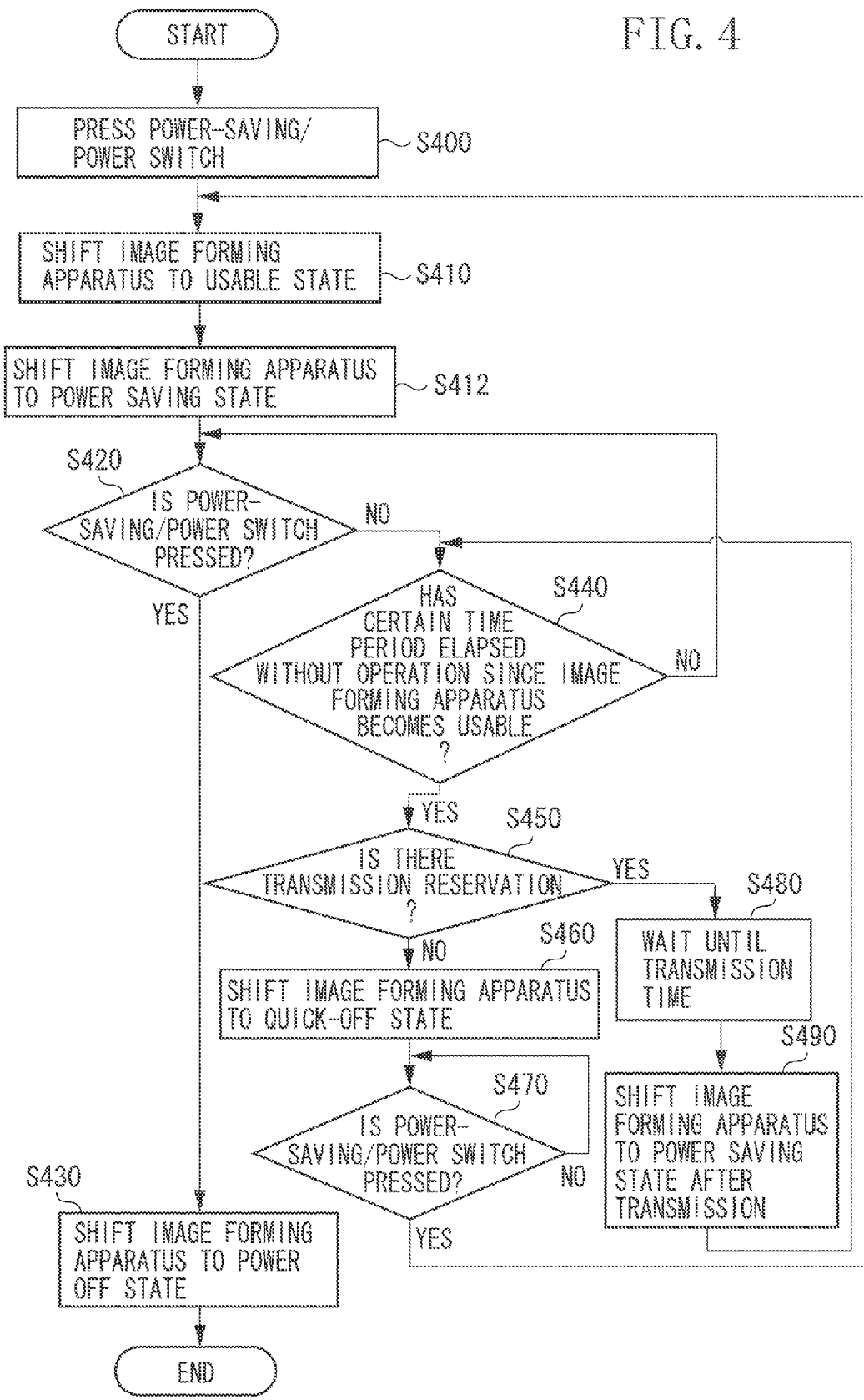

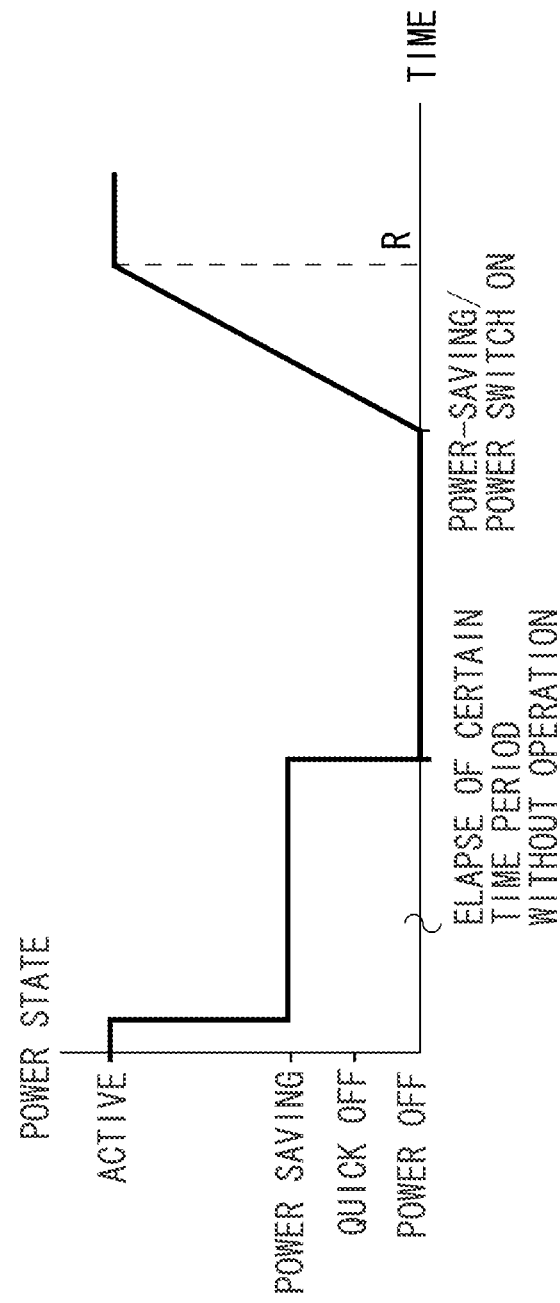

IMAGE FORMING APPARATUS, POWER SUPPLY CONTROL METHOD FOR IMAGE FORMING APPARATUS, AND STORAGE MEDIUM

BACKGROUND OF THE INVENTION

Field of the Invention

The present invention relates to an image forming apparatus, a control method for an image forming apparatus, and a computer-readable storage medium.

Description of the Related Art

In recent years, an image forming apparatus typified by a multifunctional peripheral (MFP) tends to consume more power during normal use. On the other hand, in order to meet international regulations such as International Energy Star, Blue Angel, and energy-using product (EuP) Lot 6, information equipment typified by an image forming apparatus needs to shift automatically to a power saving state if a function thereof is not used for a predetermined time period or longer.

Generally, when an apparatus shifts to a power saving state, a power supply of the entire apparatus is not actually turned off. In the power saving state, the apparatus is in a kind of standby state, so that a memory of a controller remains powered-on. Moreover, when an image forming apparatus shifts to a power saving state, not only a memory of a controller, but also a network and a facsimile apparatus often remain powered-on. Accordingly, the image forming apparatus can receive a job from a remote host and a facsimile message even in the power saving state.

Japanese Patent Application Laid-Open No. 2007-108862 discusses that a network connectable peripheral device shifts to a power saving state if a network packet is not received for a certain time period.

However, the international regulations tend to have tougher requirements for power saving year by year. For example, according to EuP Lot 6, a power consumption amount in a standby mode corresponding to a power saving state should be reduced to 0.5 W or less from year 2012. Thus, if an image forming apparatus does not perform any operation for a certain time period, a shutdown thereof can be effective from a power-saving standpoint instead of shifting to a power saving state. However, if the image forming apparatus is once shut down, activation processing needs to be performed from the beginning so that the image forming apparatus becomes usable again. This processing causes a problem of a long activation time.

SUMMARY OF THE INVENTION

The present invention is directed to a configuration for enabling an image forming apparatus to be in a standby state consuming less power than a power-saving state, and shifting the image forming apparatus to a more suitable standby state when a certain time period has lapsed without using the the image forming apparatus, predicting a usage for subsequent time period.

According to an aspect of the present invention, a printing apparatus can assume a first power state in which power is supplied at least to an interface receiving an input from an external unit and power is supplied to a memory storing a program for controlling the printing apparatus, and a second power state in which power is not supplied at least to the interface and power is supplied to the memory, and power consumption is less than in the first power state. The printing apparatus includes a shifting unit configured to shift the printing apparatus to the second power state when an input from the external unit is not received for a certain time period in the first power state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an operation performed when the image forming apparatus is not used for a certain time period according to a first exemplary embodiment.

FIGS. 5A and 5B are diagrams illustrating a comparison between a power-saving state known in the art and a power-saving state of the present invention when a power-saving/power switch is turned off and on after a certain time period elapses without operation in an image forming apparatus.

DESCRIPTION OF THE EMBODIMENTS

Various exemplary embodiments, features, and aspects of the invention will be described in detail below with reference to the drawings.

Figure 1:
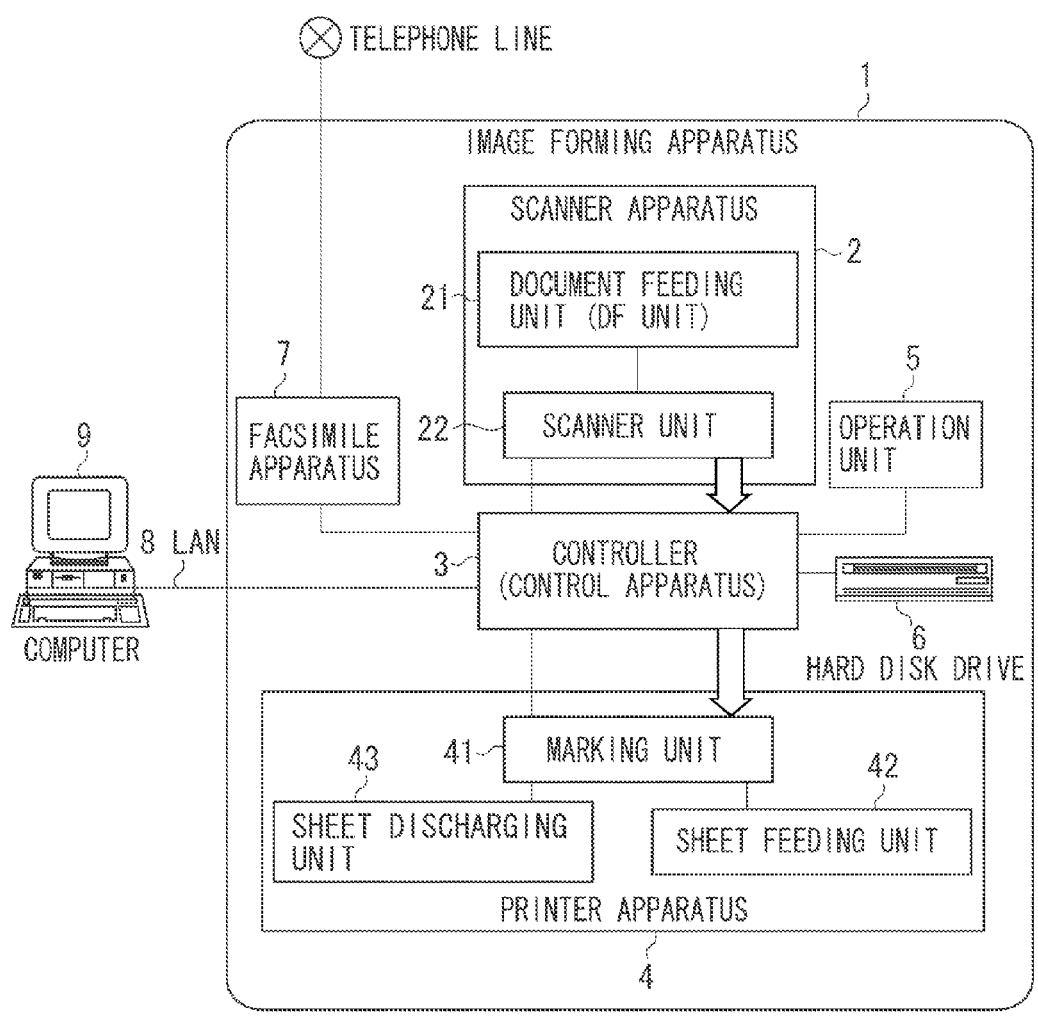
FIG. 1 is a block diagram illustrating a system including an image forming apparatus as an information processing apparatus according to one exemplary embodiment of the present invention.

A first exemplary embodiment is described with reference to FIGS. 1, 2, 3, 4, 5, and 6. FIG. 1 is a block diagram illustrating a system including an image forming apparatus as an information processing apparatus according to one exemplary embodiment of the present invention. In FIG. 1, an image forming apparatus 1 serves as an information processing apparatus of the present invention. The image forming apparatus 1 includes a scanner apparatus 2, a controller 3, a printer apparatus 4, an operation unit 5, a hard disk drive (HDD) 6, and a facsimile apparatus 7. The scanner apparatus 2 is a reading apparatus for optically reading an image from a document and converting the image into a digital image. The printer apparatus 4 is an output apparatus for outputting a digital image to a sheet medium. The operation unit 5 is used to operate the image forming apparatus 1. The HDD 6 stores a digital image and a control program. The facsimile apparatus 7 transmits and receives a digital image via a telephone line, for example.

The controller 3 is connected to each module such as the scanner apparatus 2, the printer apparatus 4, the operation unit 5, the HDD 6, and the facsimile apparatus 7. The controller 3 issues an instruction to each of the modules, thereby executing a job on the image forming apparatus 1.

The image forming apparatus 1 can input and output digital image to and from a computer 9 via a local area network (LAN) 8. The image forming apparatus 1 can also issue a job and provide an instruction to equipment. The scanner apparatus 2 includes a document feeding unit (DF unit) 21 capable of automatically changing document bundles in a successive manner, and a scanner unit 22 capable of optically scanning a document and converting the scanned document into digital image data. The converted image data is transmitted to the controller 3.

The printer apparatus 4 includes a sheet feeding unit 42 capable of successively feeding sheets one by one from a sheet bundle, a marking unit 41 used to print image data on a fed sheet, and a sheet discharging unit 43 for discharging a printed sheet.

The image forming apparatus 1 has a plurality of functions and is capable of executing various jobs. Some of the examples are as follows.

A) Copy function: To record an image read from the scanner apparatus 2 in the HDD 6, and simultaneously print the image using the printer apparatus 4.
B) Image transmission function: To transmit an image read by the scanner apparatus 2 to the computer 9 via the LAN 8.
C) Image storing function: To record an image read by the scanner apparatus 2 in the HDD 6, and print or transmit the image as needed.
D) Image printing function: To analyze, for example, a page description language transmitted from the computer 9, and print the analyzed data using the printer apparatus 4.

Figure 2:
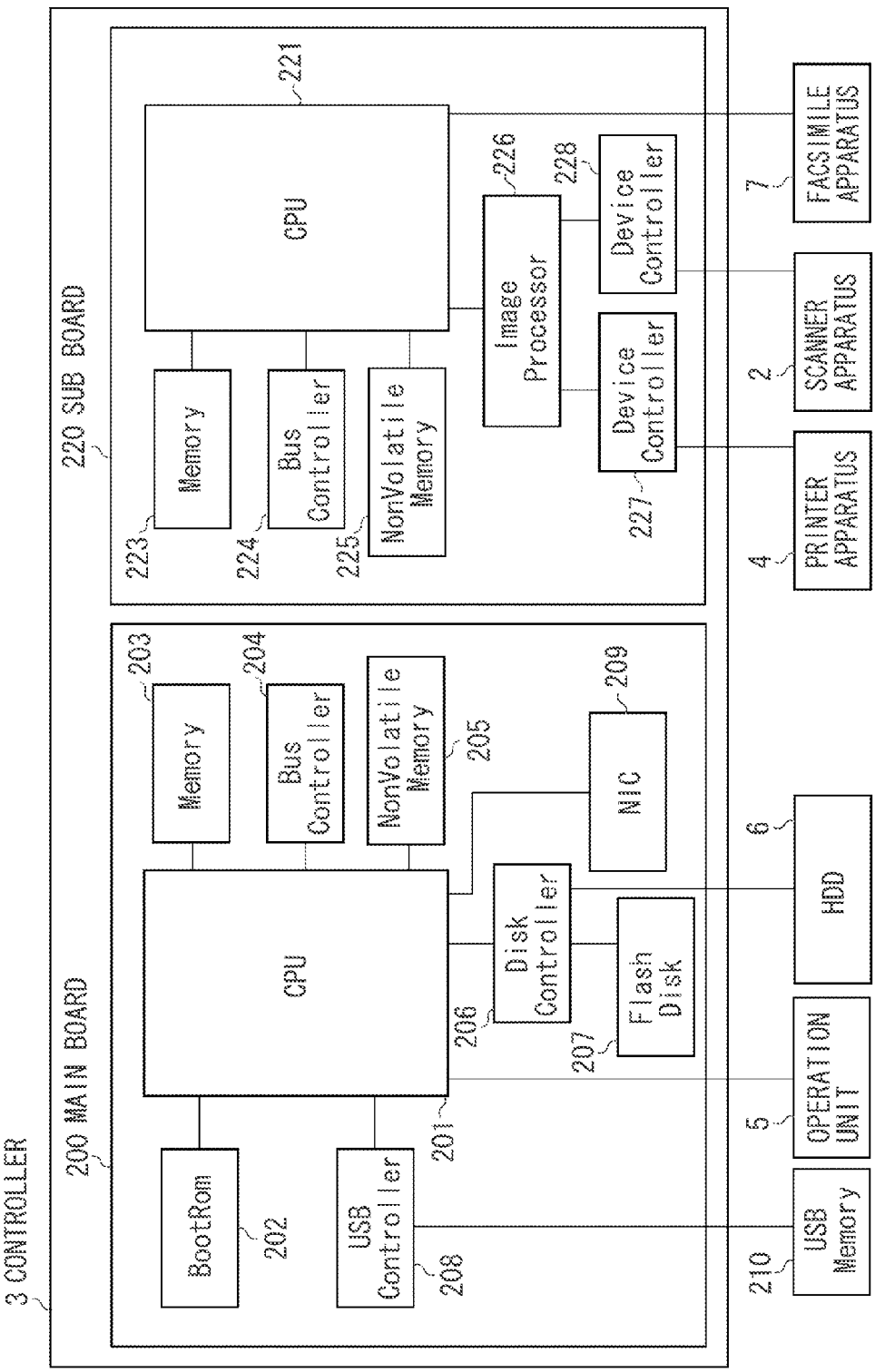
FIG. 2 is a block diagram illustrating one example of a configuration of a controller.

FIG. 2 is a block diagram illustrating one example of a configuration of the controller 3. The present invention is particularly applied to the controller 3 as a module, and the controller 3 is described with reference to FIG. 2. The controller 3 includes a main board 200 and a sub board 220 as illustrated in FIG. 2. The main board 200 is a general-purpose central processing unit (CPU) system. The sub board 220 includes a CPU 201, a boot read-only-memory (ROM) 202, a memory 203, a bus controller 204, a non-volatile memory 205, a disk controller 206, a flash disk (e.g., a solid state disk (SSD)) 207, a universal serial bus (USB) controller (USB interface) 208, and a network interface card (NIC) 209.

The CPU 201 controls the entire main board 200. The boot ROM 202 stores a boot program. The memory 203 is a random access memory (RAM) used as a work memory by the CPU 201. The bus controller 204 has a bridge function interfacing to an external bus. The non-volatile memory 205 can store and retain data even when the power is shut off.

The disk controller 206 controls a storage device such as the HDD 6. The flash disk (e.g., SSD) 207 is a storage device having a relatively small capacity and includes a semiconductor device. The USB controller 208 controls USB equipment such as a USB memory 210. The NIC 209 controls communications with a network.

The main board 200 is externally connected to the USB memory 210, the operation unit 5, and the HDD 6. The sub board 220 includes a general-purpose CPU system having a relative small capacity, and image processing hardware. The sub board 220 includes a CPU 221, a memory 223, a bus controller 224, a non-volatile memory 225, an image processor 226, and device controllers 227 and 228.

The CPU 221 controls the entire sub board 220. The memory 223 is a RAM used as a work memory by the CPU 221. The bus controller 224 has a bridge function interfacing to an external bus. The non-volatile memory 225 can store and retain data even when the power is shut off. The image processor 226 performs real time digital image processing. The device controller 228 controls a connection to the scanner apparatus 2, and provides digital image data input from the scanner apparatus 2 to the image processor 226. The device controller 227 controls a connection to the printer apparatus 4, and provides the digital image data having undergone image processing by the image processor 226 to the printer apparatus 4. The facsimile apparatus 7 is directly controlled by the CPU 221.

Figure 6:
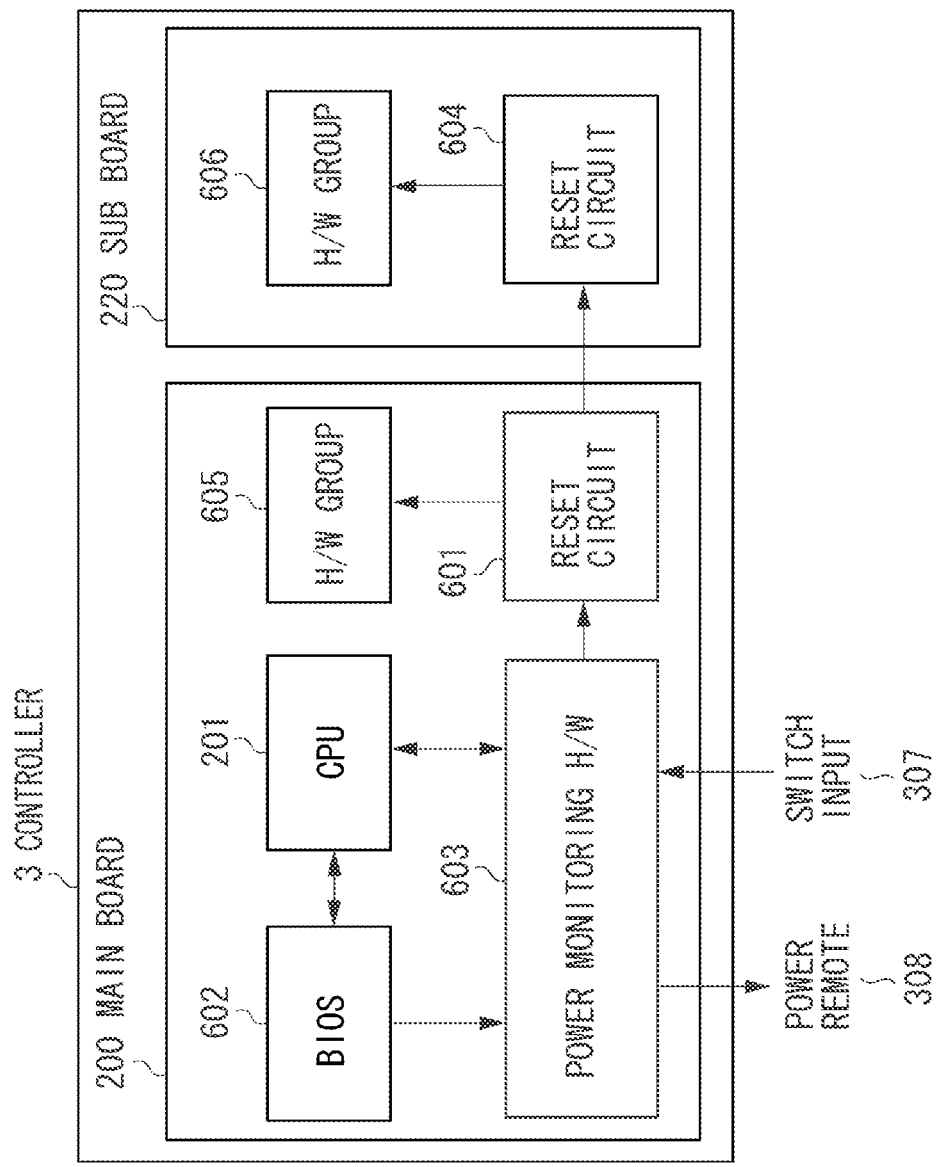
FIG. 6 is a block diagram mainly illustrating a power control and a reset circuit of a controller.

The diagram illustrated in FIG. 2 is a simplified block diagram. For example, although CPU 201 and the CPU 221 include CPU peripheral hardware such as a chip set, a bus bridge, and a clock generator, such hardware is omitted in the diagram illustrated in FIG. 2 for the sake of simplicity. However, the present invention is not limited to the configuration in this block diagram. One portion of the configuration omitted in the diagram illustrated in FIG. 2 is illustrated in FIGS. 3 and 6.

Now, an operation of the controller 3 is described using an example case in which an image is copied on a sheet medium. When a user gives an image copying instruction from the operation unit 5, the CPU 201 transmits an image reading command to the scanner apparatus 2 through the CPU 221. The scanner apparatus 2 optically scans a sheet document and converts the scanned document into digital image data. Then, the scanner apparatus 2 inputs the digital image data into the image processor 226 through the device controller 228. The image processor 226 transfers the digital image data to the memory 223 through the CPU 221 by using direct memory access (DMA) transfer, and the digital image data is temporarily stored in the memory 223.

When the CPU 201 confirms that a certain volume or all of the digital image data is stored in the memory 223, the CPU 201 instructs the printer apparatus 4 through the CPU 221 to print the image. The CPU 221 informs the image processor 226 of a position of the image data in the memory 223. The image processor 226 transmits the image data in the memory 223 to the printer apparatus 4 through the device controller 227 according to a synchronous signal from the printer apparatus 4, so that the digital image data is printed on a sheet medium by the printer apparatus 4.

When a plurality of sets of print copies is made, the CPU 201 can store the image data of the memory 223 in the HDD 6 and then transmit the image data to the printer apparatus 4 without inputting the image data from the scanner apparatus 2 for a second or later copy.

FIG. 6 is a block diagram mainly illustrating a power control and a reset circuit of the controller 3. A reset circuit 601 is provided on the main board 200. A basic input output system (BIOS) 602 controls basic processing of hardware (H/W) on the main board 200. A power monitoring H/W 603, serving as a dedicated H/W logic circuit, monitors a power control of this system. If the power monitoring H/W 603 is an application specific integrated circuit (ASIC), a small CPU system may be used.

A reset circuit 604 is provided on the sub board 220. An H/W group 605 is provided on the main board 200. An H/W group 606 is provided on the sub board 220.

Since synchronous H/W such as H/W mounted on the main board 200 and the sub board 220 is configured to reset an internal state, a reset circuit needs to reset each H/W after a power supply is turned on and power is supplied to each chip. Moreover, since a plurality of H/W chips has a master-slave relationship, a reset sequence needs to be designed to sequentially reset the H/W chips. Thus, in general, one board has one reset circuit, and each reset circuit performs a reset operation inside the corresponding board as shown in the present exemplary embodiment.

A system of the main board 200 serves as a main board in this apparatus in particular, and includes the power monitoring H/W 603 having various functions. For example, the power monitoring H/W 603 can receive an input of a switch state from a power-saving/power switch 301 via a line 307 as illustrated in FIG. 3, and control the power supply in the main board 200 using a power remote signal 308.

In a state that the CPU 201 can operate in a normal manner, the system can be reset according to an instruction of the CPU 201. On the other hand, in a state that the power is not supplied to the CPU 201, the power monitoring H/W 603 can control the power remote signal 308 according to the input of the power switch via the line 307, thereby supplying the power to the controller 3.

The BIOS 602 includes a low-level H/W control library. The BIOS 602 is generally used to ensure compatibility of an international business machine (IBM) compatibles, and is not necessarily provided on a computer system. However, since the BIOS 602 can execute, for example, a part of a power saving function according to the advanced configuration and power interface (ACPI) standard, the BIOS 602 is described in the present exemplary embodiment.

In the present invention, a commonly used ACPI-S3 method (for resuming a memory) is described as an example of a standby state. Moreover, the BIOS 602 is described only for a part of the function.

In the image forming apparatus 1 having such a H/W configuration, for example, when a user turns off the power-saving/power switch 301 illustrated in FIG. 3, the CPU 201 can receive a state of the power switch 301 through the line 307 and the power monitoring H/W 603. That is, the CPU 201 normally performs a shutdown sequence upon detection of the power off, and gives a shutdown instruction to the power monitoring H/W 603. An example of the shutdown sequence is now described.

In the shutdown sequence, for example, the CPU 201 stops communication processing of the facsimile apparatus 7, the USB controller 208, and the NIC 209. Moreover, the CPU 201 transfers and stores data that needs to be backed up even after the power off in the non-volatile memory 205, the data including data received by the facsimile apparatus 7 and setting data from the operation unit 5, among the data stored in the memory 203. In addition, when an auxiliary storage device such as the HDD 6 in which an end sequence at the time of power off is prescribed is used, the CPU 201 executes the prescribed power off control with respect to the auxiliary storage device. When such a sequence is finished, the CPU 201 gives a shutdown instruction to the power monitoring H/W 603.

In response to the shutdown instruction, the power monitoring H/W 603 notifies an alternating current-direct current (AC-DC) converter 303 illustrated in FIG. 3 of the power off through the power remote signal 308, and turns off a power cable 306 serving as a DC power supply source of the controller 3, thereby completely shutting down the system.

In this shut down, a program on the CPU 201 ends completely. Therefore, when the power-saving/power switch 301 is turned on next time, the program of the CPU 201 starts in a normal manner.

Next, an operation of an ACPI-S3 suspend method according to the present exemplary embodiment is described. The CPU 201, for example, calls a power-saving interface (I/F) of an operation system (OS), thereby ultimately transitioning to an ACPI-C3 state as a function of the BIOS 602 and the power monitoring H/W 603. The CPU 201 can instruct a power supply unit 302 illustrated in FIG. 3 through the power remote signal 308 to transition to the ACPI-C3 power-saving state. In this state, only the memory 203 and a portion of the H/W are in an energized state.

Herein, the system is in a "temporary stop state" in which a program state is maintained in the memory 203 instead of being in a power-off state, and can resume execution of a program within a short time when a suspended state is released by a predetermined external factor.

The image forming apparatus 1 of the present exemplary embodiment has a function of causing a part of a memory to remain energized by the operation of the ACPI-S3 suspend method while the power-saving/power switch 301 is off. This function can shorten a waiting time elapsing from when a user turns on the power-saving/power switch 301 until an operation such as a copy operation is actually executable.

In this state (a state illustrated in FIG. 3C described below), the NIC 209 and the facsimile apparatus 7 are not energized unlike in a power-saving state (a state illustrated in FIG. 3B described below). Awaiting state (FIG. 3C) of this function is called a "quick-off state", whereas a state in which the power supply is off in a normal manner is called a "power-off state" for the sake of differentiation.

A use case of the image forming apparatus 1 of the present exemplary embodiment includes, for example, a case in which the image forming apparatus 1 shifts to the power-off state only in a specific situation although the image forming apparatus 1 is normally in the quick-off state to shorten a waiting time. The specific situation includes night hours, a non-business day, and long holidays during which the image forming apparatus 1 should be in the power-off state as the quick-off state consumes a little amount of the power. Accordingly, the image forming apparatus 1 of the present invention is configured such that a user can select a setting whether to shift the image forming apparatus 1 to the "quick-off state" or the "power-off state" after the power-saving/power switch 301 illustrated in FIG. 3 is turned off. For example, the user can select the setting by operating a predetermined button of the operation unit 5 in advance. This setting is retained in the non-volatile memory 205.

In the image forming apparatus 1 of the present exemplary embodiment, there are cases where determination of whether to transition to the "quick-off state" or the "power-off state" depends on an internal state of the image forming apparatus 1 when the power-saving/power switch 301 is turned off.

Figure 3A:
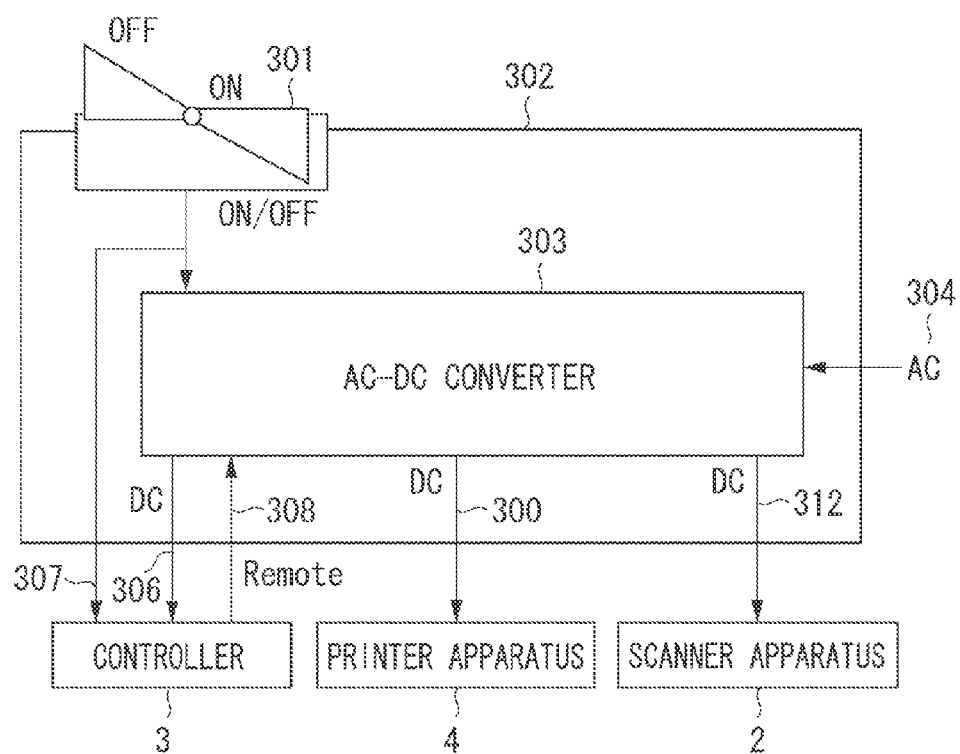
FIGS. 3A, 3B, and 3C are diagrams each illustrating a configuration of a power supply and a power switch in the image forming apparatus, and a power supply state.

Next, a configuration of a power supply and a power switch, and a power supply state in the image forming apparatus 1 are described with reference to FIGS. 3A, 3B, and 3C. FIG. 3A illustrates a configuration of the power supply and the power-saving/power switch 301 in the image forming apparatus 1. The power-saving/power switch 301 is a toggle-type switch, and mechanically maintains either an on-state or an off-state. An operator inputs the on-state or the off-state by pushing down the power-saving/power switches 301 toward either an on-side or an off-side.

The power supply of the image forming apparatus 1 includes the power supply unit 302, the AC-DC converter 303, an AC power input unit 304, a power cable 306 for supplying DC power to the controller 3, a DC power cable 300 for supplying power to the printer apparatus 4, and a power cable 312 for supplying CD power to the scanner apparatus 2.

Moreover, in the power supply of the image forming apparatus 1, the line 307 is used to notify the controller 3 of a state of the toggle-type power-saving/power switch 301. The power remote signal 308 can control an output of the AC-DC converter 303.

A user can turn on and off the image forming apparatus 1 by operating the power-saving/power switch 301. The power-saving/power switch 301 is connected to the AC-DC converter 303 while the image forming apparatus 1 is being turned on, so that an energized state of the power supply can be controlled.

The energized state (power state) of the image forming apparatus 1 includes a "power-off state", a "power-on state (active state)" as a first power state, a "power saving state" as a second power state, and a "quick-off state" as a third power state. Each of these states is described as follows.

When the image forming apparatus 1 is in the "power-on state (active state)", the power is supplied to each of all locations in FIG. 3. When the image forming apparatus 1 is shifted to the "power-off state", the power supply to the controller 3 using the power cable 306 does not stop until a shutdown of the system by the controller 3 is completed. The controller 3 executes the shutdown upon notification of a situation in which the power-saving/power switch 301 is turned off via the line 307. After completion of the shutdown, the controller 3 uses the power remote signal 308 to turn off the supply to the controller 3 of the DC power using the power cable 306. The power supply to each of the printer apparatus 4 and the scanner apparatus 2 using the respective power cables 300 and 312 stops when the power-saving/power switch 301 is turned off. Accordingly, the power supply to all locations illustrated in FIG. 3 stops.

When the image forming apparatus 1 shifts to the "power-saving state", the supply of DC power to each of the printer apparatus 4 and the scanner apparatus 2 is turned off. In such a case, the power is supplied to the controller 3 as illustrated in FIG. 3B. FIG. 3B is a diagram illustrating a portion of the AC-DC converter 303 and the controller 3 in detail.

Figure 3B:
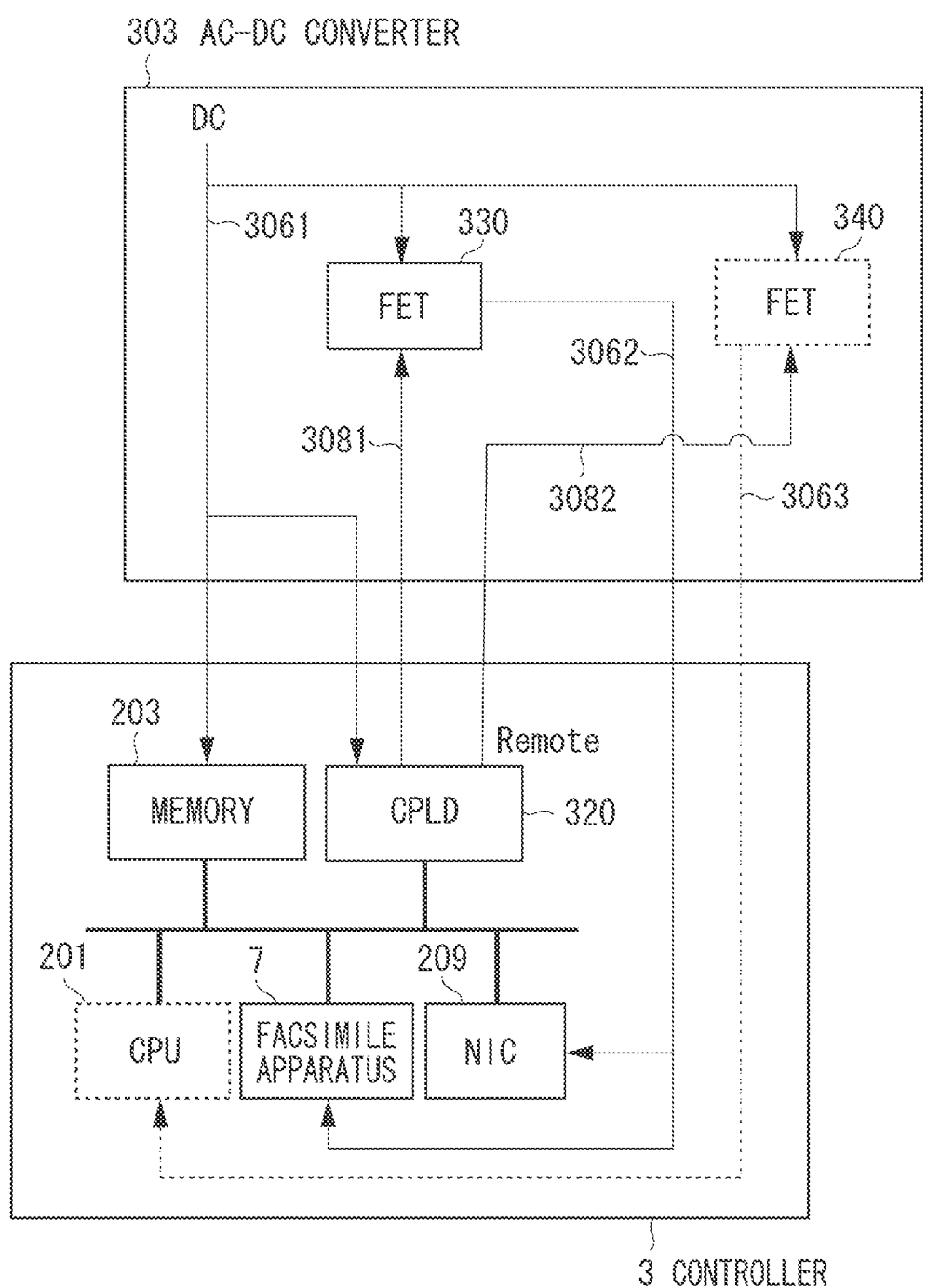

The AC-DC converter 303 includes field effect transistors (FET) 330 and 340 illustrated in FIG. 3B. The controller 3 includes the CPU 201, the memory 203, a complex programmable logic device (CPLD) 320, and the NIC 209. Since the cause of return from the power-saving state is a receipt of a facsimile message by the facsimile apparatus 7, in FIG. 3B, the controller 3 includes the facsimile apparatus 7 for the sake of convenience. The CPLD 320 is provided inside the power monitoring H/W 603 illustrated in FIG. 6.

When the image forming apparatus 1 is in the "power-saving state", only the FET 340 is turned off according to a remote signal 3082 notified from the CPLD 320 to the AC-DC converter 303. Then, a power supply 3063 (a dotted line in FIG. 3B) connected to the FET 340, to the CPU 201 is turned off, since the CPU 201 does not need to be energized in the power-saving state. On the other hand, power supplies 3061 and 3062 (solid lines in FIG. 3B) to the memory 203, the CPLD 320, the NIC 209, and the facsimile apparatus 7 remain turned on, each of which needs to be energized in the power-saving state.

Moreover, when the image forming apparatus 1 shifts to the "quick-off state", the DC power supply 3062 to each of the printer apparatus 4 and the scanner apparatus 2 is turned off. In such a case, the power is supplied to the controller 3 as illustrated in FIG. 3C.

When the image forming apparatus 1 is in the "quick-off state", the FET 330 and the FET 340 are turned off according to the respective remote signals 3081 and 3082 notified from the CPLD 320. Then, the power supplies 3062 and 3063 (dotted lines in FIG. 3C) connected to the respective FET 330 and the FET 340, to the NIC 209, CPU 201, and the facsimile apparatus 7 are turned off, each of which does not need to be energized in the quick-off state. On the other hand, the power supply 3061 to the memory 203 and the CPLD 320 remains turned on each of which needs to be energized in the quick-off state.

Therefore, when the image forming apparatus 1 is in the "quick-off state", the power supply to the larger number of hardware modules than that in the power-saving state is stopped, thereby consuming even less power than that in the power-saving state. However, since the NIC 209 and the facsimile apparatus 7 cannot be used in the "quick-off state", a job from a remote host and a facsimile message cannot be received.

In the present exemplary embodiment, an toggle-type switch explicitly turning off and on is used. However, there are many cases in which a power switch having no state (including a power switch functioning as a power saving shifting switch) is employed in a personal computer. The switch having not state has the following control patterns.

1) When the apparatus is in a power-on state, the switch functions as an "OFF/power-saving shifting instruction".
2) When the apparatus is not in a power-on state, the switch functions as "ON".
3) When the switch is pressed for a certain time period or longer, "forced-OFF" is input.

The information processing apparatus of the present invention is not limited to the use of the toggle-type switch. If a switch having no state is used in the information processing apparatus of the present invention, on/off of the toggle switch can be applied to the on/off patterns of (1) and (2) described above.

FIG. 4 is a flowchart illustrating an operation performed when the image forming apparatus 1 is not used for a certain time period in the first exemplary embodiment. Processing of this flowchart is executed by the controller 3 of the image forming apparatus 1 by performing an operation according to a program. For example, processing is executed by the CPU 201 by performing an operation according to a program stored in the HDD 6 or the flash disk 207, or by the CPLD 320 by performing an operation according to a program written in a programming element inside. The processing is executed by the CPU 201 according to a program when the CPU 201 is in operation, whereas the processing is executed by the CPLD 320 when the CPU 201 is stopped.

In step S400, when the power-saving/power switch 301 in the image forming apparatus 1 which is not powered is pressed, in step S410, the power supply unit 302 supplies power to each unit of the image forming apparatus 1, so that the image forming apparatus 1 is activated and shifted to a usable state, that is, a "power-on state (active state).

Subsequently, in step S412, the CPU 201 shifts the image forming apparatus 1 to a "power-saving state" (a first shift processing) if the CPU 201 determines that a predetermined condition is satisfied. The predetermined condition includes a lapse of a certain time period without operation. In the power-saving state, the power supply to the CPU 201 stops while the power supply to the memory 203, the facsimile apparatus 7, and the NIC 209 continues as illustrated in FIG. 3B.

In step S420, in the power-saving state, the CPLD 320 monitors a state of the power-saving/power switch 301, and determines whether the power-saving/power switch 301 is pressed. When the power-saving/power switch 301 is pressed, the CPLD 320 is notified via the line 307 of the turn-off of the power saving/power switch 301.

If the CPLD 320 determines that the power-saving/power switch 301 is pressed (YES in step S420), then operation proceeds to step S430. In step S430, the CPLD 320 turns off the DC power supply through the power cable 306 to the controller 3 by using the power remote signal 308, so that the image forming apparatus 1 is shifted to a power-off state, and the operation of the flowchart ends.

On the other hand, if the power-saving/power switch 301 is not pressed (NO in step S420), then in step S440, the CPLD 320 determines whether a certain time period has elapsed without operation since the image forming apparatus 1 becomes usable. Herein, the "operation" is not limited to an operation from the operation unit 5. For example, even when a job is input through the LAN 8 and the facsimile apparatus 7, the CPLD 320 can determine such a job input as the operation. That is, if any instruction is input to the image forming apparatus 1 from an external unit, then in step S440, the CPLD 320 determines that the operation has been performed.

If the certain time period has not yet elapsed (NO in step S440), the CPLD 320 causes the operation to return to step S420. If an operation is performed before the certain time period elapses (not illustrated), the CPLD 320 transmits the power remote signal 3082 illustrated in FIG. 3B to the FET 340 inside the AC-DC converter 303. Accordingly, the power supply to each unit of the image forming apparatus 1 being powered off is resumed, and then the image forming apparatus 1 returns to a standby mode and becomes usable.

On the other hand, if the certain time period has elapsed without operation since the image forming apparatus 1 becomes usable (YES in step S440), the operation proceeds to step S450. In step S450, the CPLD 320 determines whether there is a transmission reservation for the facsimile apparatus 7 or the NIC 209. Transmission reservation information is stored in the memory 203 or the non-volatile memory 205. Herein, the transmission reservation for the facsimile apparatus 7 and the NIC 209 is described. However, a communication reservation including a reception reservation may also be used. Moreover, the communication reservation is not limited to communication with an external unit. As long as a reservation is for job execution, other job execution reservations can be used for the determination in step S450.

If the CPLD 320 determines that there is a transmission reservation (YES in step S450), then in step S480, the CPLD 320 waits until a reserved transmission time comes. When the reserved transmission time comes, the CPLD 320 causes the operation to proceed to step S490. In step S490, the CPLD 320 turns on the FET 340 inside the AC-DC converter 303 using the power remote signal 3082 illustrated in FIG. 3B, so that the image forming apparatus 1 returns to the "power-on state (active state)". Moreover, the CPU 201 executes transmission processing of the transmission reservation. Upon completion of the transmission processing, the CPU 201 shifts the image forming apparatus 1 to the "power-saving state", and then the CPLD 320 causes the operation to proceed to step S440.

On the other hand, if there is no transmission reservation (NO in step S450), then in step S460, the CPLD 320 controls the image forming apparatus 1 to shift to a "quick-off state" (a second shift processing). That is, the CPLD 320 turns off the FET 340 inside the AC-DC converter 303 by using the power remote signal 3081 illustrated in FIG. 3B. Herein, in a case where the power-saving/power switch 301 is a toggle-type switch explicitly turning on and off, the CPLD 320 turns off the power-saving/power switch 301 by driving a drive unit (e.g., a solenoid, not illustrated) inside the power-saving/power switch 301. That is, in a case where the power-saving/power switch 301 is capable of explicitly maintaining an on-state and an off-state, the power saving/power switch 301 is changed to the off-state. When the image forming apparatus 1 shifts to the quick-off state, the power supply to each of the facsimile apparatus 7 and the NIC 209 also stops as illustrated in FIG. 3C.

Subsequently, in step S470, the CPLD 320 monitors a state of the power saving/power switch 301, and determines whether the power saving/power switch 301 is pressed. If the CPLD 320 detects, based on an input from the line 307, that the power saving/power switch 301 is pressed (YES in step S470), the CPLD 320 transmits the power remote signal 308 to the AC-DC converter 303. Subsequently, the operation returns to step S410 in which the power is supplied to each unit of the image forming apparatus. Then, the image forming apparatus 1 returns to a standby mode and shifts to a usable state. In the "quick-off state", since a program state is maintained in the memory 203, execution of a program can be resumed in a short time. Therefore, the image forming apparatus 1 can return to the standby mode in a short time compared to activation from the power-off state.

In the flowchart illustrated in FIG. 4, the operation is described using an example in which the power saving/power switch 301 is turned off in the power-saving state (Yes in step S420), then in step S430, the power is turned off. However, in a case where the "quick-off state" is set by the operation unit 5 beforehand (stored in the non-volatile memory 205) as the transition state after the power saving/power switch 301 is turned off in the power-saving state, the CPLD 320 controls the image forming apparatus 1 to transition to the "quick-off state". In this case, the CPLD 320 causes the operation to proceed to step S470, and monitors a state of the power saving/power switch 301 again. That is, when the power saving/power switch 301 is turned off in the power-saving state, the CPLD 320 controls the image forming apparatus 1 to shift to the power-off state or the quick-off state (third shift processing).

Moreover, if the certain time period has elapsed without operation since the image forming apparatus 1 becomes usable (Yes in step S440), the CPLD 320 may cause the operation to proceed to step S460. In step S460, the CPLD 320 shifts the image forming apparatus 1 to the "quick-off state".

Moreover, in the flowchart, in a case where an operation is not performed for the certain time period in the power-saving state, the image forming apparatus 1 is shifted to the quick-off state. However, the image forming apparatus 1 may be directly shifted to the quick-off state in a case where an operation is not performed for the certain time period in the standby state.

As described in the flowchart, when an operation is not performed for the certain time period in the power-saving state (or the standby state), the image forming apparatus 1 shifts to the quick-off state which consumes less power than the power-saving state. Moreover, if there is a transmission reservation (a predetermined job execution reservation), the image forming apparatus 1 does not shift to the quick-off state in spite of the absence of an operation for the certain time period, thereby reliably processing the transmission reservation.

Figure 5B:
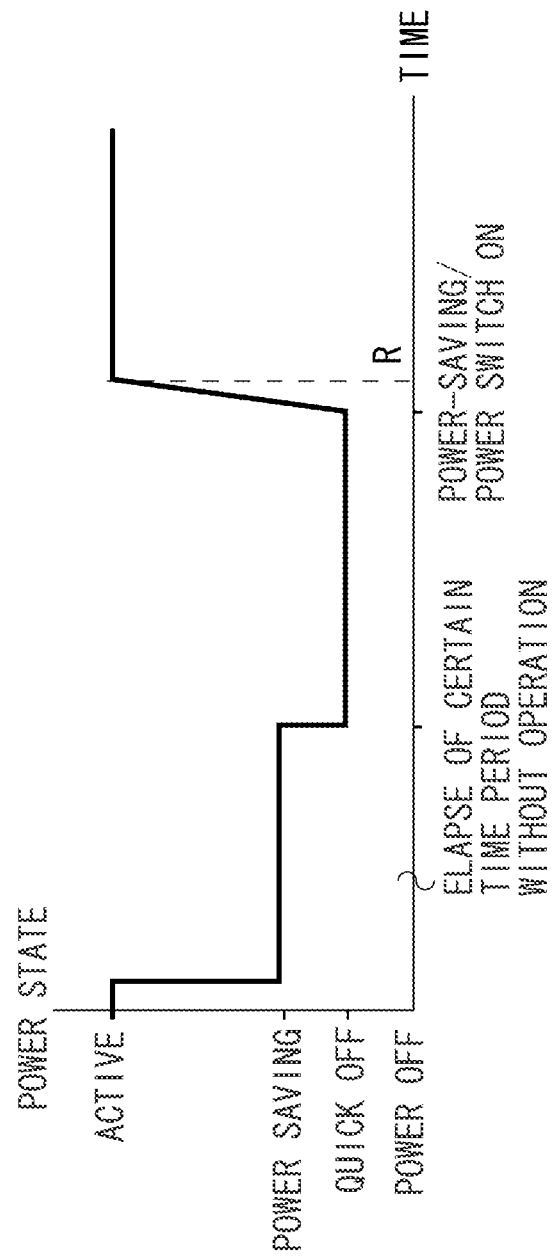

FIGS. 5A and 5B are diagrams illustrating a comparison between a power-saving state known in the conventional art and a power-saving state of the present invention in case where a power saving/power switch is turned off and on after a certain time period elapses without operation in an image forming apparatus. In each of FIGS. 5A and 5B, a vertical axis represents a power state, and a horizontal axis represents an elapsed time. Moreover, on the horizontal axis, a reference letter "R", illustrated in a point after the power saving/power switch 301 is turned off, represents that the image forming apparatus is in a usable state after the point of "R".

FIG. 5A illustrates a power state of a conventional image forming apparatus. That is, the power state in FIG. 5A corresponds to a case where the conventional image forming apparatus is shut down and shifted to a power-off state when a certain time period elapses without operation. In this case, even if a power saving/power switch is turned on after the conventional image forming apparatus shifts to the power-off state, the apparatus cannot be in a usable state immediately due to consumption of activation processing time.

FIG. 5B illustrates a power state of the image forming apparatus 1 of the present invention. That is, the power state in FIG. 5B corresponds to a case where the image forming apparatus 1 is shifted to a quick-off state when a certain time period elapses without operation. In this case, if the power saving/power switch 301 is turned on after the image forming apparatus 1 is shifted to the quick-off state, the image forming apparatus 1 can enter a usable state immediately. In other words, the image forming apparatus 1 of the present invention is activated from the power-off state at higher speed than the conventional image forming apparatus.

In the present invention, therefore, when the certain time period elapses without operation, the image forming apparatus 1 can remain in a state (quick-off state) consuming less power than the power-saving state and it can return to a normal state at high speed according to an operation of the power saving/power switch 301.

Consequently, when the certain time period elapses without operation, the image forming apparatus 1 can shift to the "quick-off state", which is a more suitable standby state consuming less power than the power-saving state according to a prediction of the usage for the subsequent time period.

That is, the present exemplary embodiment of the present invention can provide the image forming apparatus 1 capable of shifting to the "quick-off state" in addition to the power-saving state. In the "quick-off state", the image forming apparatus 1 can not only suppress power consumption but also return to a normal state at high speed.

A second exemplary embodiment is described with reference to FIGS. 1, 2, 3, 5, 6, and 7. In the first exemplary embodiment, when there is no transmission reservation such as a facsimile message transmission reservation, the image forming apparatus is determined to have no usage prediction and then shifted to a quick-off state. In the second exemplary embodiment, when external equipment is not connected to an external connection interface, an image forming apparatus is determined to have no usage prediction and then shifted to a quick-off state.

The second exemplary embodiment is particularly effective when an image forming apparatus 1 is connected to an external host through an external connection interface. For example, when the image forming apparatus 1 is connected to information equipment such as a personal computer being used by one user through an external connection interface such as USB, the second exemplary embodiment is effective.

Herein, the second exemplary embodiment is described using a USB as an example of the external connection interface. However, other external connection interfaces may be used, for example, IEEE (institute of electrical and electronics engineers) 1394 interface, Thunderbolt interface, and an external connection interface according a secure digital (SD) card standard or other standards may be used. In other words, as long as a password can be supplied from a host computer similar to the USB interface, other interfaces can also be used.

In the second exemplary embodiment, if the USB is in an energized state when a certain time period has lapsed without operation, it is determined that now, the image forming apparatus 1 may possibly be used by a user, and the image forming apparatus 1 is shifted to a quick-off state. On the other hand, if the USB is in a non-energized state, it is determined that the image forming apparatus 1 will not be used by a user for a while, and the image forming apparatus 1 is shut down and shifted to a power-off state. Such an operation is described in detail with reference to FIG. 7. The second exemplary embodiment is substantially the same as the first exemplary embodiment except for the operation described with reference to FIG. 7.

The description of the second exemplary embodiment with reference to FIGS. 1, 2, 3, 5, and 6 is substantially the same as that of the first exemplary embodiment. In the second exemplary embodiment, power is supplied from an AC-DC converter 303 to a USB controller 208 in a power-saving state, and the power supply from the AC-DC converter 303 to the USB controller 208 stops in a quick-off state.

Figure 7:
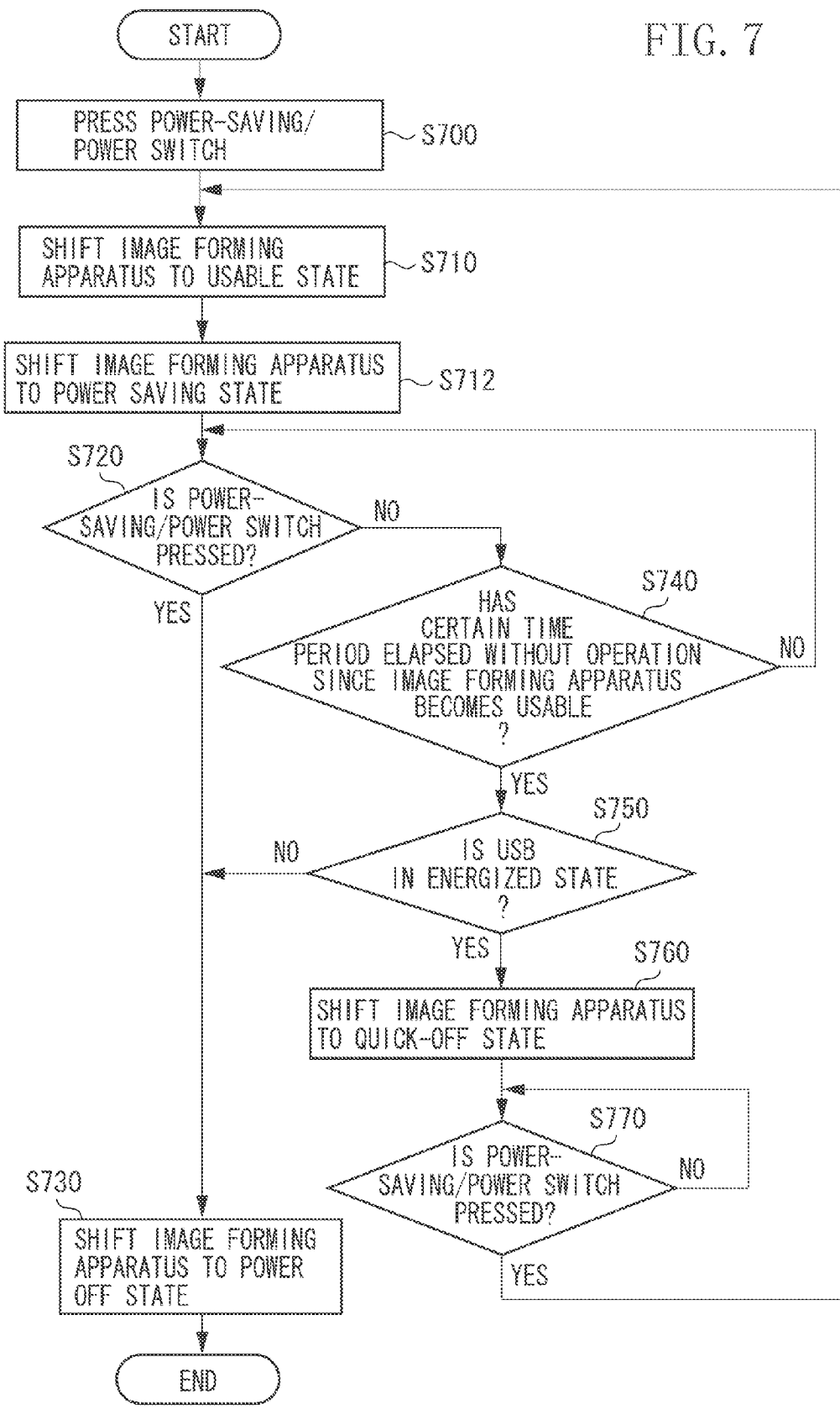
FIG. 7 is a flowchart illustrating an operation performed when an image forming apparatus is not used for a certain time period according to a second exemplary embodiment.

FIG. 7 is a flowchart illustrating an operation performed when the image forming apparatus 1 is not used for a certain time period according to the second exemplary embodiment. A controller 3 of the image forming apparatus 1 executes the processing of the flowchart by performing an operation according to a program. For example, the processing is executed by a CPU 201 performing an operation according to a program stored in a HDD 6 or a flash disk 207, and by a CPLD 320 performing an operation according to a program written in a programming element inside. The processing is executed by the CPU 201 according to a program when the CPU 201 is in operation, whereas processing is executed by the CPLD 320 when the CPU 201 is stopped.

Now, only a step different from that of FIG. 4 is described, while a description of the step same as that of FIG. 4 is omitted. Since the processing in step S700 through step S740 illustrated in FIG. 7 is substantially the same as that in step S400 through step S440 illustrated in FIG. 4, a description thereof is omitted. In step S750, the CPLD 320 determines whether a USB is in an energized state. The CPLD 320 determines whether USB bus power is supplied to the USB controller 208 from the USB equipment connected to the USB controller 208.

If the USB is not in the energized state (i.e., the USB bus power is not supplied) (NO in step S750), then in step S730, the CPLD 320 turns off DC power supply to the controller 3 through a power cable 306 using a power remote signal 308. Thus, the image forming apparatus 1 is shifted to a power-off state, and the operation of the flowchart ends.

On the other hand, if the USB is in the energized state (i.e., the USB power is supplied) (YES in step S750), then in step S760, the CPLD 320 controls the image forming apparatus 1 to shift to a "quick-off state". That is, the CPLD 320 turns off an FET 340 inside the AC-DC converter 303 using a power remote signal 3081 illustrated in FIG. 3B. Herein, in a case where a power saving/power switch 301 is a toggle-type switch explicitly turning on and off, the CPLD 320 turns off the power-saving/power switch 301 by driving a drive unit (e.g., a solenoid, not illustrated) inside the power-saving/power switch 301.

Figure 3C:
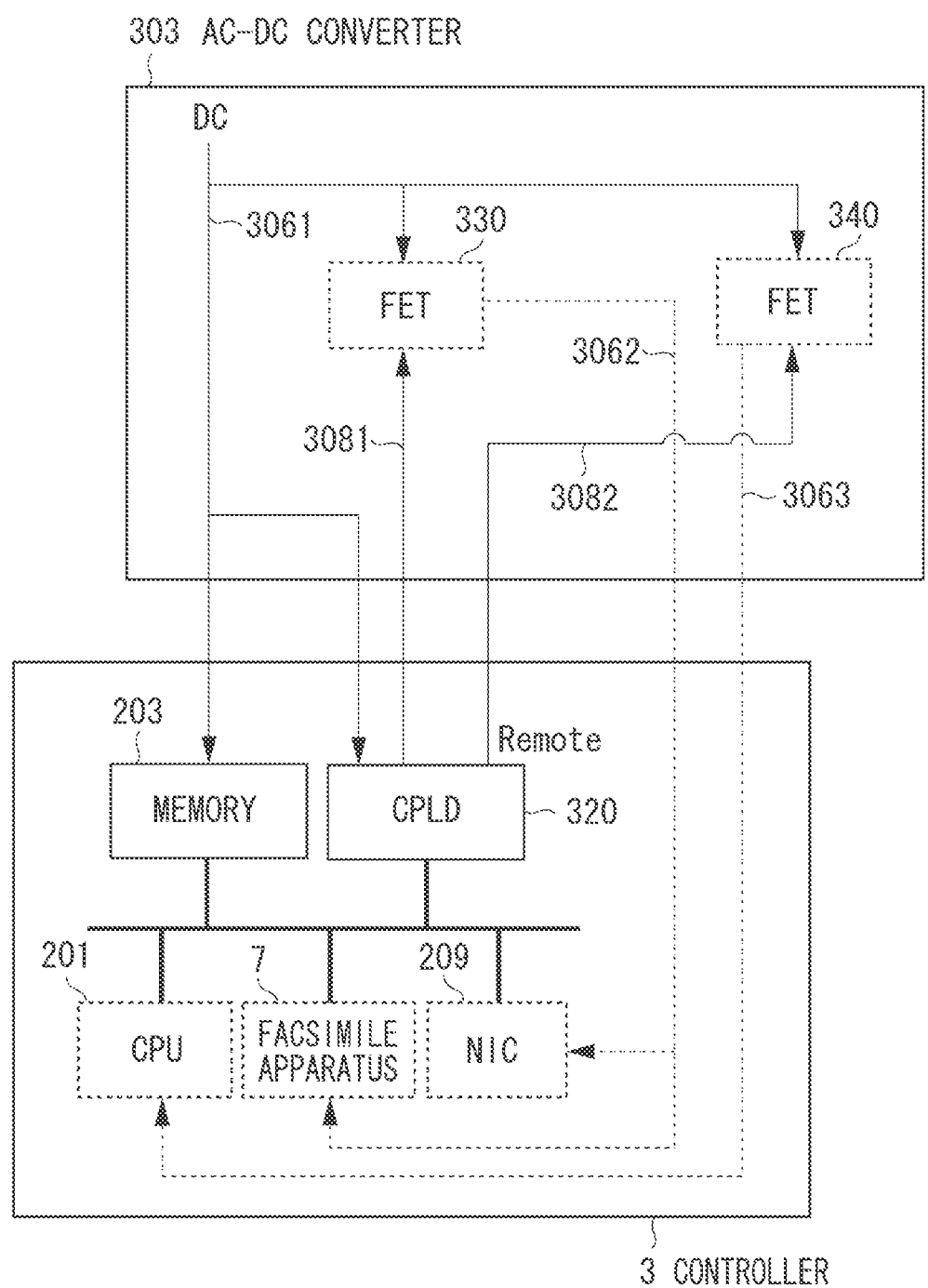

When the image forming apparatus 1 is shifted to the quick-off state, the power supply to each of a facsimile apparatus 7 and a NIC 209 stops as illustrated in FIG. 3C. Since processing in step S770 is same as that in step S470 illustrated in FIG. 4, a description thereof is omitted.

As described in the flowchart, when an operation is not performed for the certain time period in the power-saving state (or a standby state), and when the USB serving as an external connection interface is in the energized state, it is determined that an external host such as a personal controller (PC) is connected to the image forming apparatus 1 through the USB controller 208. Therefore, it is determined that the image forming apparatus 1 can be used with the external host by a user, and the image forming apparatus 1 is shifted to the quick-off state. Consequently, the image forming apparatus 1 not only can remain in a state consuming less power than a power-saving state, but also can return to a normal state at high speed when the user uses the image forming apparatus 1.

On the other hand, when the USB is in a non-energized state, the image forming apparatus 1 is not connected to an external host through the USB controller 208, so that it is determined that the user is not using the image forming apparatus 1 anymore. Consequently, the image forming apparatus 1 is shut down and shifted to the power-off state.

According to the present invention, therefore, when the certain time period elapses without operation, the image forming apparatus 1 can remain in a state (quick-off state) consuming less power than that in the power-saving state and can return to a normal state at high speed in response to an operation of the power saving/power switch 301.

Consequently, when the certain time period has elapsed without operation, the image forming apparatus 1 can shift to the "quick-off state" as a suitable standby state predicting a usage for the subsequent time period, which consumes less power than the power-saving state. Thus, the image forming apparatus 1 on standby in the quick-off state consumes very little power and can be activated at a high-speed.

In the second exemplary embodiment, the power is supplied from AC-DC converter 303 to the USB controller 208 in the power-saving state. Although the power is supplied from the AC-DC converter 303 to the USB controller 208 in the power-saving state in the second exemplary embodiment, the power may not necessarily be supplied from the AC-DC converter 303 to the USB controller 208 in the power-saving state. In this case, the USB controller 208 is operated by the power supplied by USB bus power from an external host in the power-saving state.

Therefore, the information processing apparatus of the present invention is described using the image forming apparatus 1 as an example. However, the information processing apparatus of the present invention is not limited to an image forming apparatus. Other information processing apparatuses may be used.

The configuration of various data and the contents thereof described above are not limited thereto, and may be variously provided according to a purpose and a use. Although one exemplary embodiment is described, the present invention may be applied to an exemplary embodiment as a system, an apparatus, a method, a program, or a storage medium, for example. Particularly, the present invention can be applied to a system including a plurality of equipment, or an apparatus including one equipment. Moreover, the present invention can include a combination of each of the above exemplary embodiments.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-022870 filed Feb. 6, 2012, which is hereby incorporated by reference herein in its entirety.

What is claimed is:

1. A printing apparatus comprising:
a volatile memory which stores data;
a processor which reads data stored in the volatile memory or writes data in the volatile memory;
a network interface which receives data from an external apparatus; and
a power control circuit which shifts, based on a lapse of a certain time period in a first power state in which power is supplied to the network interface and the volatile memory and power is not supplied to the processor, the printing apparatus from the first power state to a second power state in which power is supplied to the volatile memory and power is not supplied to the network interface and the processor.

2. The printing apparatus according to claim 1, wherein, even if the certain time period lapses in the first power state, the power control circuit does not shift the printing apparatus from the first power state to the second power state in a case where there is a reservation for communication with the external apparatus.

3. The printing apparatus according to claim 1, further comprising an external connection interface which receives power supply from the external apparatus connected thereto,
wherein, based on the lapse of the certain time period in the first power state and supply of power from the external apparatus to the external connection interface, the power control circuit shifts the printing apparatus from the first power state to the second power state, and, based on the lapse of the certain time period in the first power state and non-supply of from the external apparatus to the external connection interface, the power control circuit shifts the printing apparatus from the first power state to a power-off state in which power is not supplied to the volatile memory, the network interface, and the processor.

4. The printing apparatus according to claim 3, wherein the external connection interface is a Universal Serial Bus (USB) interface.

5. The printing apparatus according to claim 3, wherein the external connection interface is an Institute of Electrical and Electronics Engineers (IEEE) 1394 interface.

6. The printing apparatus according to claim 1, further comprising:
a switch which is in an on-state or an off-state by a user's operation; and
an actuator which moves the switch to off-state from the on-state, wherein the power control circuit controls the actuator to move the switch to the off-state from the on-state, based on the lapse of the certain time period in the first power state.

7. The printing apparatus according to claim 1, further comprising a switch which is an on-state or an off-state by a user's operation,
wherein the power control circuit shifts the printing apparatus to a power-off state in which power is not supplied to the volatile memory, the network interface, and the processor based on move of the switch from the on-state to the off-state by the user's operation.

8. The printing apparatus according to claim 6, wherein the switch is a rocker switch.

9. The printing apparatus according to claim 1, wherein the second power state is Advanced Configuration and Power Interface-State 3 (ACPI-S3) state.

10. The printing apparatus according to claim 1, further comprising:
a switch which is in an on-state or an off-state by a user's operation; and
an actuator which moves the switch to off-state from the on-state,
wherein the power control circuit controls the actuator to move the switch to the off-state from the on-state, based on the lapse of the certain time period in the first power state.

11. The printing apparatus according to claim 1, further comprising a switch which is in an on-state or an off-state by a user's operation,
wherein the power control circuit shifts the printing apparatus to a power-off state in which power is not supplied to the volatile memory, the network interface, and the processor based on move of the switch from the on-state to the off-state by the user's operation.

12. A control method for a printing apparatus having a network interface which receives data from an external apparatus, the control method comprising:
shifting, using a processor which reads data stored in a volatile memory or writes data in the volatile memory and based on a lapse of a certain time period in a first power state in which power is supplied to the network interface and the volatile memory and power is not supplied to the processor, the printing apparatus from the first power state to a second power state in which power is supplied to the volatile memory and power is not supplied to the network interface and the processor.

13. A printing apparatus comprising:
a volatile memory which stores data;
a processor which reads data stored in the volatile memory or writes data in the volatile memory;
a network interface which receives data from an external apparatus; and
a power control circuit which stops power supply to the network interface, based on a lapse of a certain period in a power saving state in which power is supplied to the network interface and the volatile memory and power is not supplied to the processor.

* * * * *